United States Patent [19]

Kanata

[11] Patent Number: 5,101,277
[45] Date of Patent: Mar. 31, 1992

[54] AUTOMATIC FOCUS ADJUSTMENT APPARATUS FOR PERFORMING POSITION CONTROL BETWEEN CONSECUTIVE IMAGES

[75] Inventor: Yoshio Kanata, Katano, Japan

[73] Assignee: Matshushita Electric Industrial Co., Ltd., Kadoma, Japan

[21] Appl. No.: 465,234

[22] PCT Filed: Jul. 11, 1989

[86] PCT No.: PCT/JP89/00696
§ 371 Date: Mar. 15, 1990
§ 102(e) Date: Mar. 15, 1990

[87] PCT Pub. No.: WO90/01241
PCT Pub. Date: Feb. 8, 1990

[30] Foreign Application Priority Data

Jul. 19, 1988 [JP] Japan .................. 63-179551

[51] Int. Cl.$^5$ .................. H04N 5/232; G01J 1/20
[52] U.S. Cl. .................. 358/227; 250/201.3
[58] Field of Search .............. 358/227, 225, 55, 213.31, 358/93, 213.26, 213.22; 350/521, 520, 518, 515, 507; 250/201.2, 201.3; 354/402

[56] References Cited

U.S. PATENT DOCUMENTS

| 4,740,828 | 4/1988 | Kinoshita | 358/48 |
| 4,752,831 | 6/1988 | Biber et al. | 358/227 |
| 4,816,916 | 3/1989 | Akiyama | 358/213.29 |
| 4,829,374 | 5/1989 | Miyamoto et al. | 358/227 |
| 4,922,346 | 5/1990 | Hidaka et al. | 358/227 |

FOREIGN PATENT DOCUMENTS 59-066274 4/1984 Japan .

Primary Examiner—James J. Groody
Assistant Examiner—Safet Metjahic
Attorney, Agent, or Firm—Cushman, Darby & Cushman

[57] ABSTRACT

The present invention is an automatic focus adjustment apparatus in which an object to be inspected is picked up by a camera (5) through an optical system (4), a video signal which is opto-electrically converted is transferred to a frame memory (9), image processing of a signal read out from the frame memory (9) is carried out, a focus adjustment evaluation quantity is calculated, and position of said optical system is controlled in a direction that the focus adjustment evaluation quantity approaches the maximum, and the position control operation of the optical system is carried out during a blanking time which is between electric charge storage times of two consecutive images of the camera.

5 Claims, 7 Drawing Sheets

Fig.2
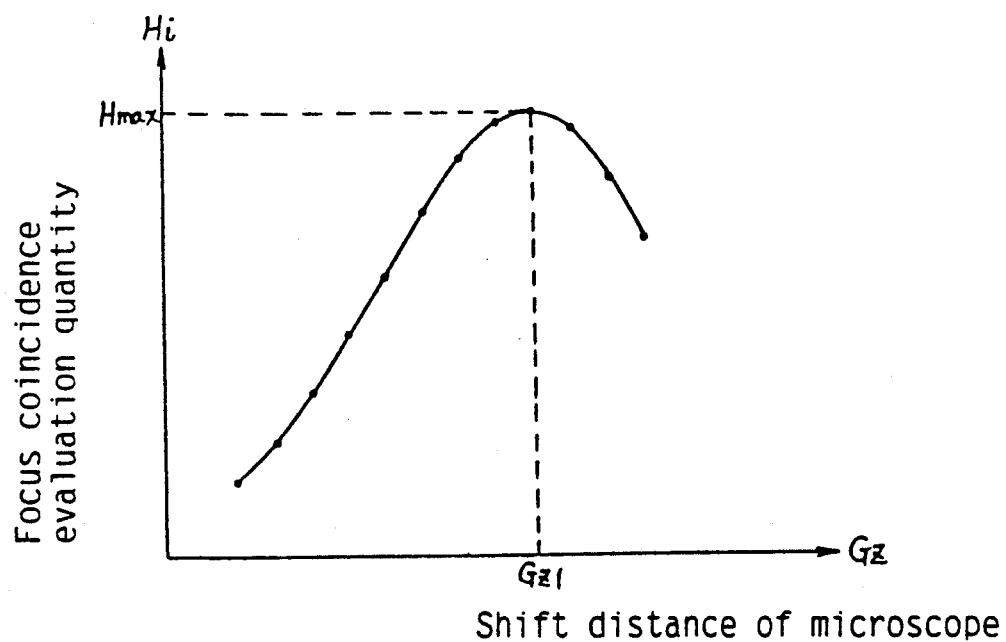
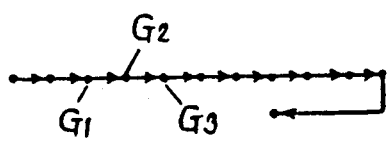

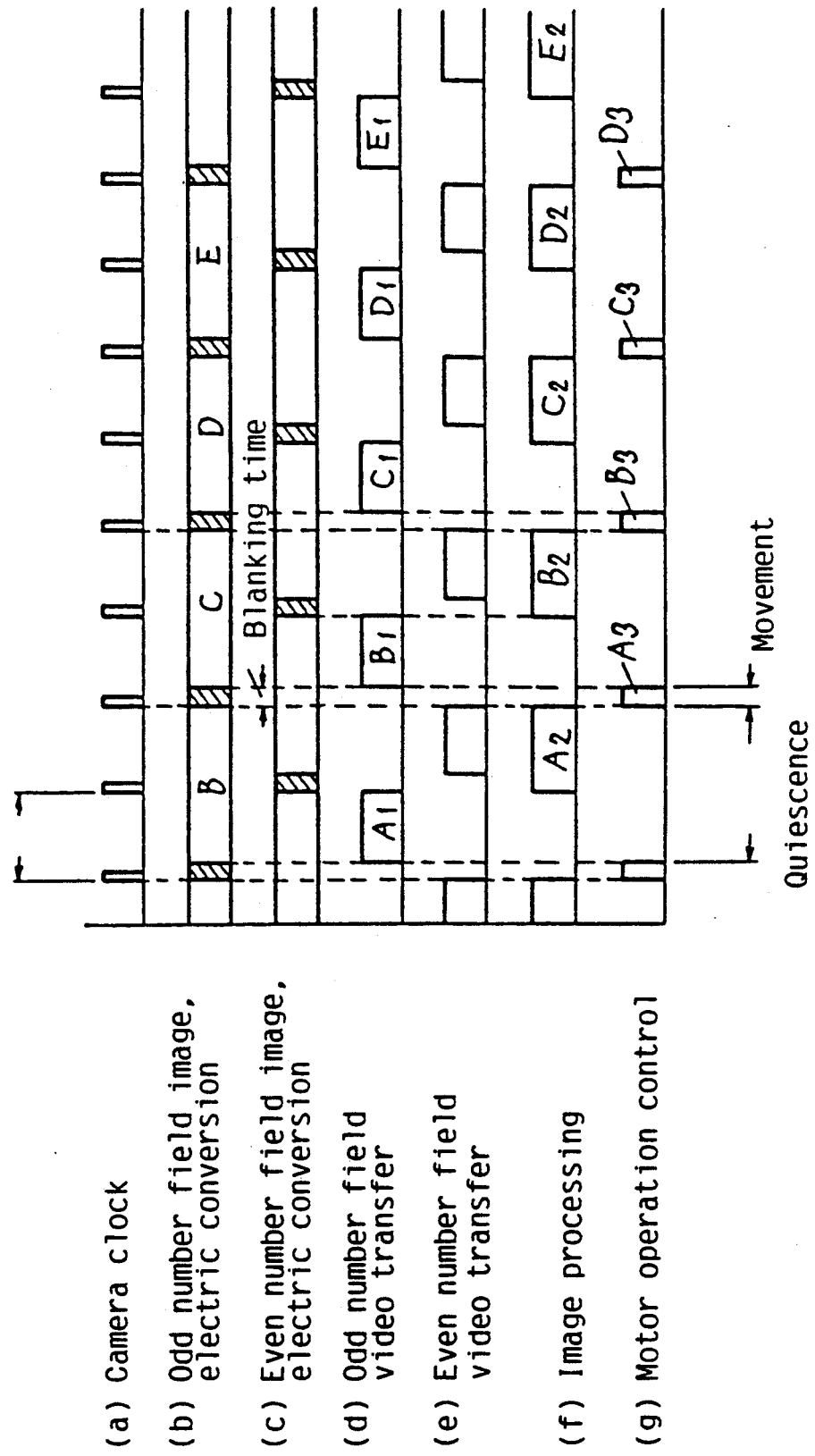

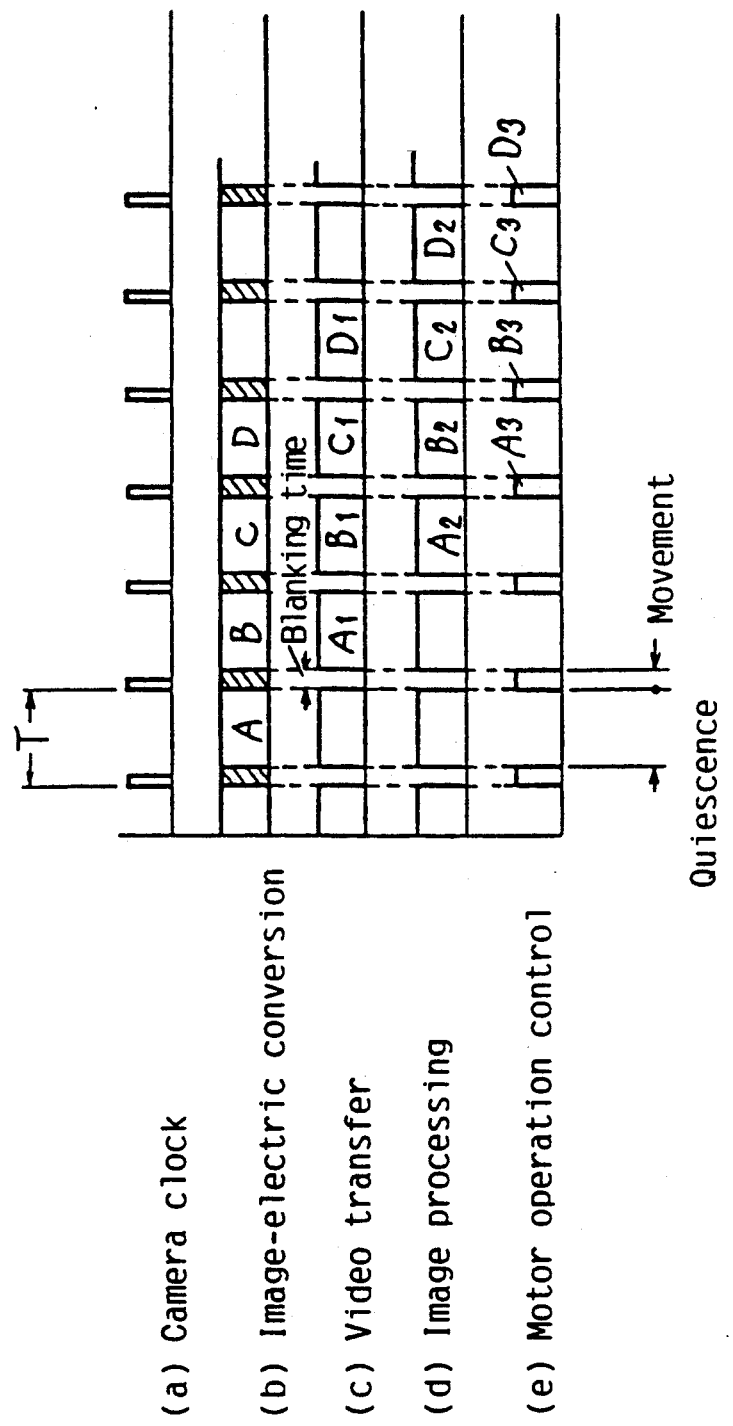

AUTOMATIC FOCUS ADJUSTMENT APPARATUS FOR PERFORMING POSITION CONTROL BETWEEN CONSECUTIVE IMAGES

DESCRIPTION

1. Technical Field

The present invention relates to an automatic focus adjustment apparatus of an optical apparatus for use in assembly and inspection works in a fabrication process and so on of an electronic equipment.

Further in detail, the present invention relates to an improvement in an automatic focus adjustment apparatus which is constituted in a manner that an object to be inspected is picked up through an optical system. A video signal which is opto-electronically converted with a camera is digitized and is transferred to a frame memory. Image processing is performed on a signal read out from the frame memory and a focus adjustment evaluation quantity is produced. Finally position control of the aforementioned optical system is made in a direction such that the focus adjustment evaluation quantity approaches the maximum.

2. Background Art

Hitherto, an optical inspection apparatus as shown in FIG. 1 is used in assembly and inspection works. An object 1 to be inspected is rested on a table 2, and a microscope 4 is installed on the table 2 with a slide table 3 therebetween so as to permit upward and downward movement. An industrial camera 5 using CCD for a solid-state image pickup device is mounted on the eyepiece part of the microscope 4, and the industrial camera 5 moves upward and downward together with the microscope 4. The slide table 3 is so configurated as to drive the microscope 4 to move up and down by a motor 6. The motor 6 is driven on the basis of an output signal of the industrial camera 5 as described hereafter and automatic focus adjustment is carried out. An image of a focused point is issued from the output of an A/D converter 7 and is inputted in an inspection apparatus which is not shown in the figure, and is used for shape inspection of the object 1 to be inspected or for such as position control of the object 1 to be inspected on the table 2.

The video signal of the industrial camera 5 is digitized by the A/D converter 7, and then is temporarily memorized alternately in first and second frame memories 9, 10 via a control part 8. Subsequently, in the control part 8, images of the first and second frame memories 9, 10 are read out alternately and image processing is applied to the images and a focus adjustment evaluation quantity is calculated. The control part 8 then drives the motor 6 by one step in a direction so that the focus adjustment evaluation quantity approaches the maximum through a drive circuit 11. Numeral 12 designates a clock generation circuit for generating a clock signal which is an operating reference of the control part 8.

The fundamental operation of the control part 8 is shown in FIG. 2-FIG. 4. The fundamental operation is to transfer the microscope 4 little by little as shown in FIG. 2, and the focus adjustment evaluation quantity Hi is calculated by such a method as calculating a differential coefficient or an integral value of a gradation levels on an edge part from an image data. When Hi has taken the maximum value $H_{max}$ so that the position of the microscope 4 is on best focus, the slide table 3 is positioned at the position $GZ_1$. At this time, for every transfers of the microscope 4 by one step, it is necessary to carry out the respective processings of image-electric conversion, video transfer to the frame memory, calculation (image processing) of the focus adjustment evaluation quantity Hi and motor operation.

In the conventional automatic focus adjustment apparatus, in order to shorten a time period of focusing, the consecutive processings are carried out in parallel and in synchronism with a camera clock as shown in FIG. 3.

Namely, a pulse interval T which is generated by the clock generation circuit 12 is set so as to be identical with the camera clock of the industrial camera 5, and by making synchronization with this clock the respective processings of the image-electric conversion, the video transfer to the frame memory, the image processing and motor operation are accomplished. Moreover, the respective processings are parallelly accomplished with a repeat periodic time of 2T in such a manner that while the video transfer is performed the subsequent motor operation is accomplished, and the subsequent image-electric conversion is accomplished while the image processing is performed. To perform the parallel processings, the first and the second frame memories 11 and 12 are used alternately. Moreover, in order to shorten a focusing time holding an accuracy of measurement after focus adjustment, the camera is used in noninterlace mode during the focusing, and after the focus adjustment, measurement is carried out by switching to 2:1 interlace mode.

FIG. 4 shows the above-mentioned operation in a flow chart.

However, in the above-mentioned configuration, there are two problems. In switching operation from the noninterlace mode to 2:1 interlace mode, a time period of about 0.2 seconds is required until the image is stabilized and the portion is a waste of time. Also, since a storage time of electric charge is different twice between noninterlace and 2:1 interlace, a brightness of an image in focusing time differs from a brightness of the image in measuring time after the focus adjustment, and inconvenience arises in image processing.

The present invention is made in view of the above-mentioned problems, and it is an object of the present invention to shorten the focusing time.

Furthermore, it is an object of the present invention to provide an automatic focus adjustment apparatus in which there is no difference between brightness of images in focusing time and in measuring time after focus adjustment.

DISCLOSURE OF INVENTION

An automatic focus adjustment apparatus of the present invention is disclosed such that an object to be inspected is picked up through an optical system, a video signal of which photoelectric conversion is carried out with a camera is digitized and is transferred to a frame memory, a focus adjustment evaluation quantity is obtained by image processing of a signal read out from the frame memory, and the position of the above-mentioned optical system is controlled in a direction in which the focus adjustment evaluation quantity approaches a maximum. In addition, the position control operation of the above-mentioned optical system is carried out within a blanking time period between electric charge storage times of consecutive two images of the camera or within a part of the time of the electric charge storage times before and after the blanking time within such a range that does not give influence to accuracy of the calculation of the focus adjustment evaluation quantity.

According to the configuration, since transfer of the optical system is carried out within the blanking time between the electric charge storage times of consecutive two images of the camera or within very short times before and after that, provided that an electric charge storage time of one image is T, apart from the conventional method wherein quiescence/movement are repeated with periodic time 2T, the quiescence/movement becomes to be repeated with a periodic time T in noninterlace mode, namely with a speed as twice high as that of the conventional method. Moreover, since mode conversion is not required even in the 2:1 interlace mode, a time loss is eliminated, and the brightness of the images in focusing time and in measuring time after the focus adjustment do not change.

BRIEF DESCRIPTION OF DRAWINGS

FIG. 2 is the curve of the focus adjustment evaluation quantity versus a shift distance of the microscope in the apparatus of FIG. 1.

FIG. 6 is a timing chart of a process in the 2:1 interlace mode of the same apparatus.

FIG. 7 is a timing chart of a process in a noninterlace mode of the same apparatus.

BEST MODE FOR CARRYING OUT THE INVENTION

Hereafter, an embodiment of the present invention is explained with reference to FIG. 5-FIG. 7.

Figure 1:
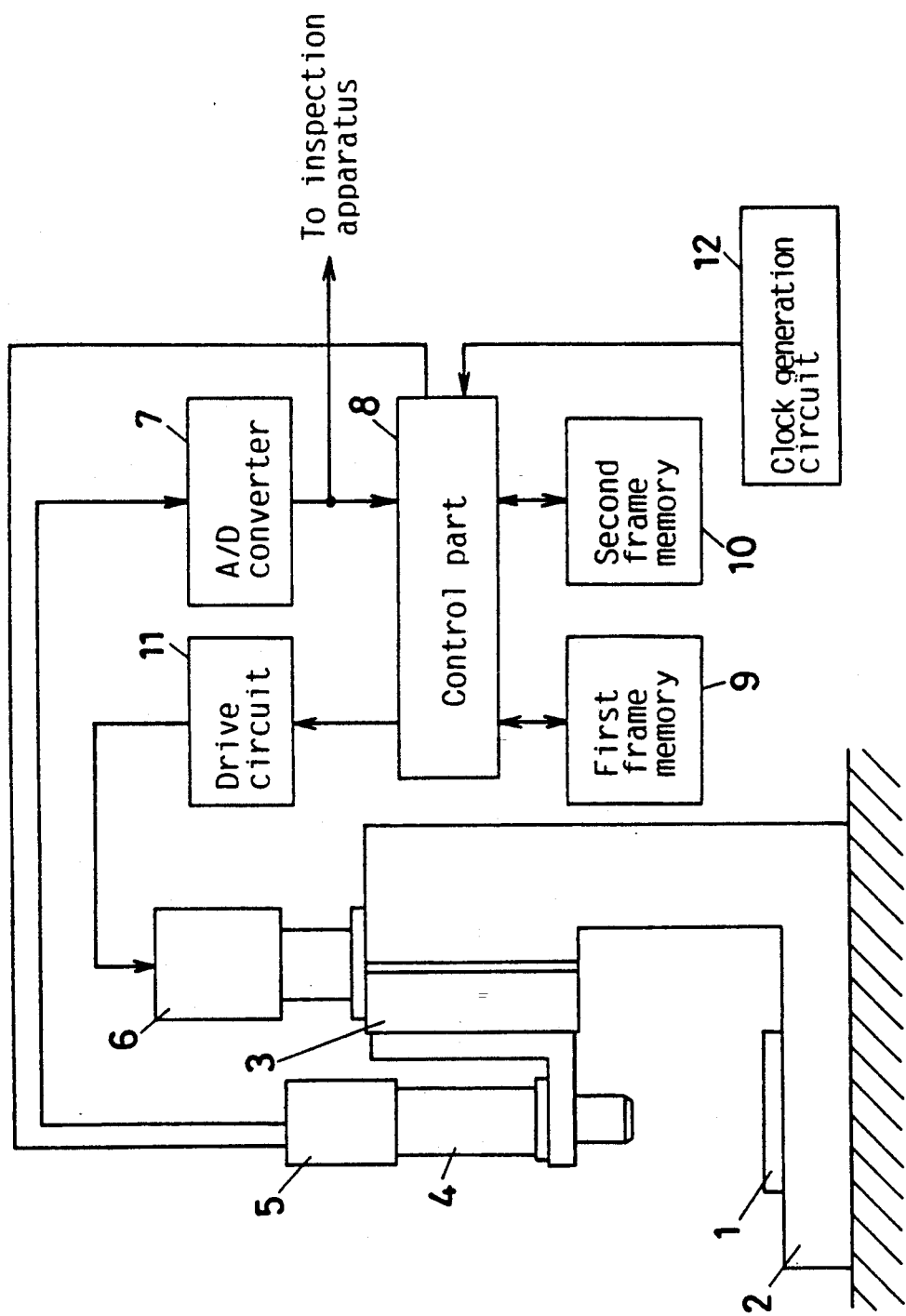
FIG. 1 is the block diagram of a conventional optical inspection apparatus having the automatic focus adjustment apparatus.
Figure 3:
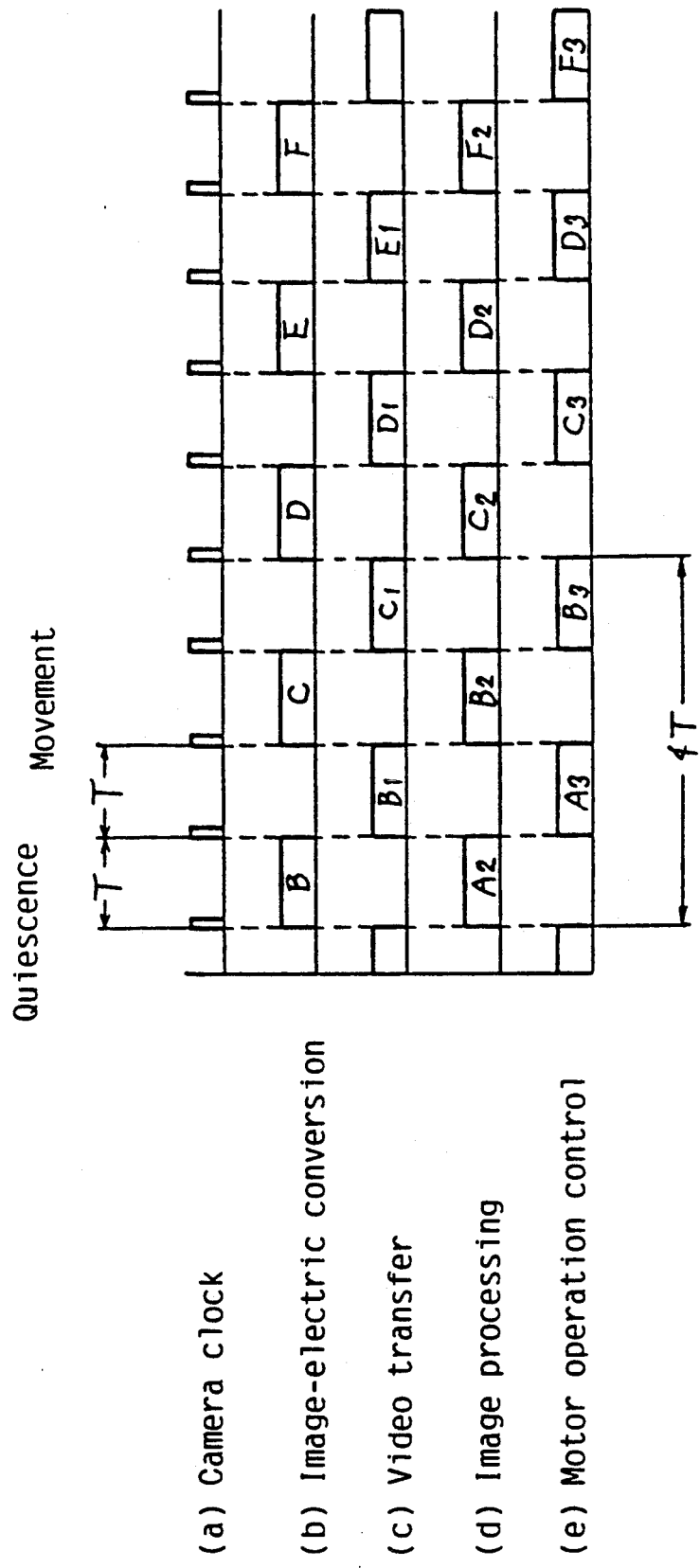
FIG. 3 is the timing chart of the process of the conventional automatic focus adjustment apparatus.
Figure 4:
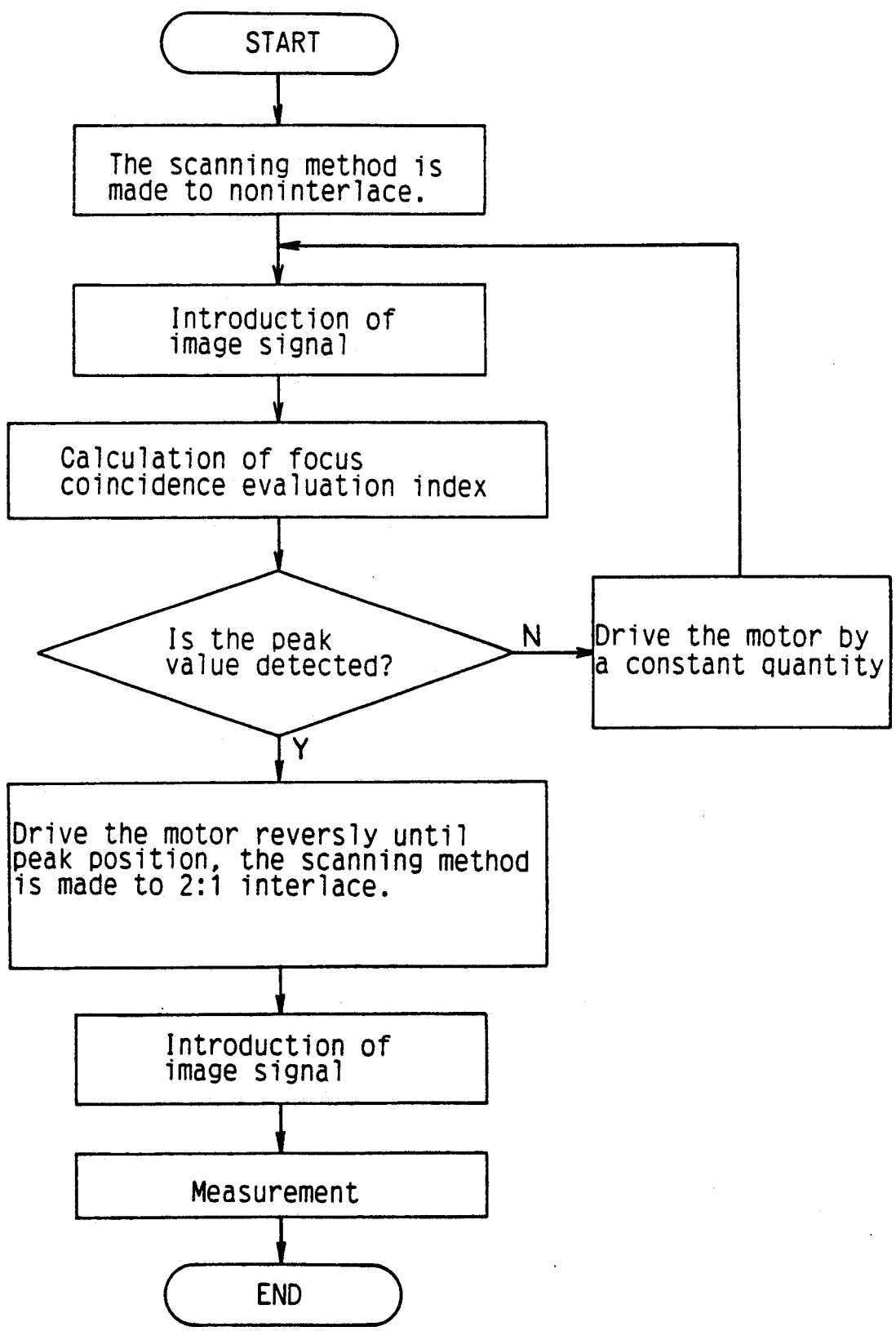
FIG. 4 is the flow chart of the process.

The optical inspection apparatus having an automatic focus adjustment apparatus of the present invention is fundamentally the same as the conventional example as shown in FIG. 1, and only the internal constitution of a control part 8 is different. However, in case of use in the 2:1 interlace mode, a second frame memory 10 is not necessary.

Figure 5:
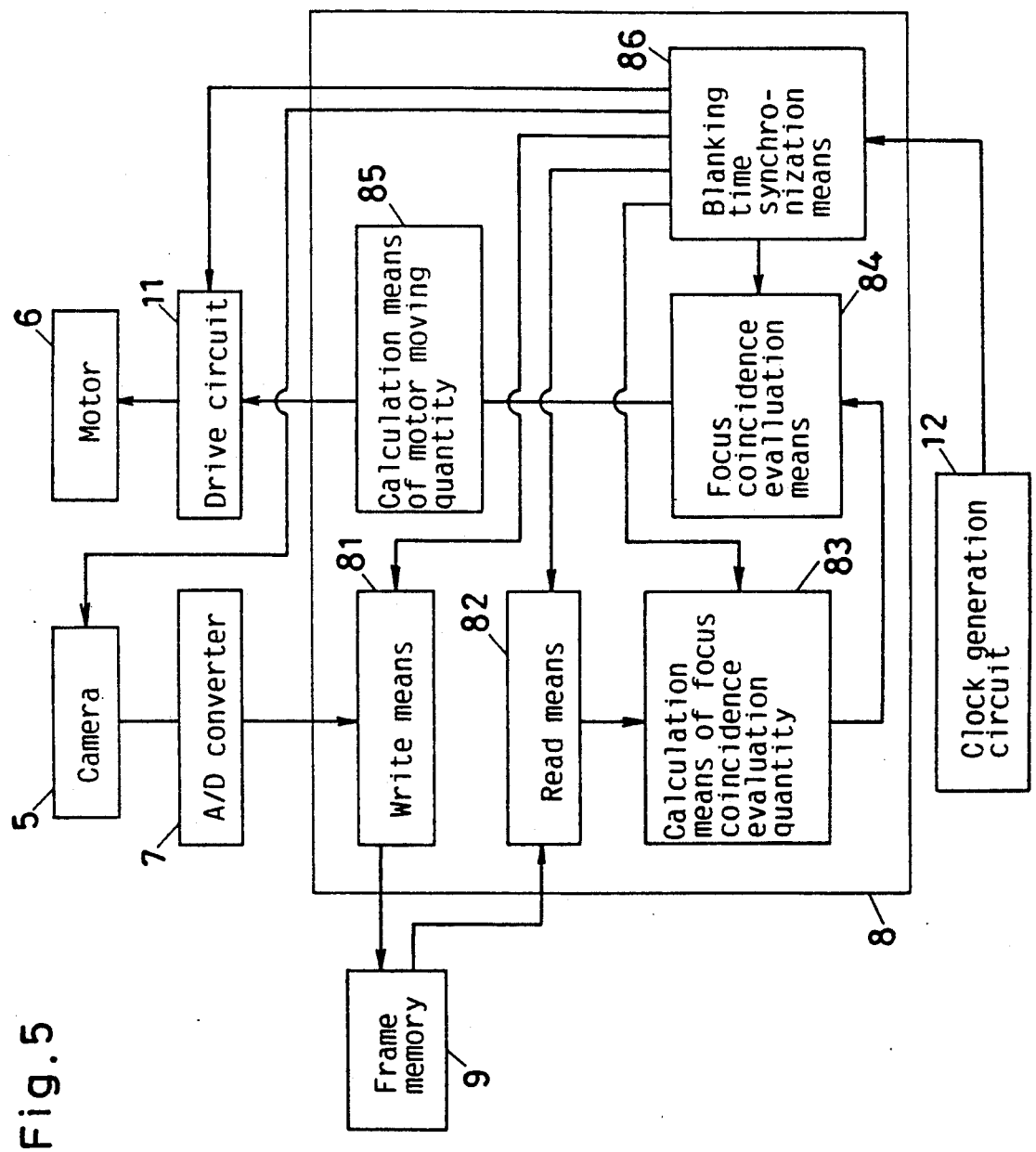
FIG. 5 is a block diagram showing an embodiment of an automatic focus adjustment apparatus in the present invention.

First, configuration of the control part 8 is elucidated with reference to FIG. 5. A video signal of a camera 5 using a CCD is, after being digitized by an A/D converter 7, temporarily stored in a frame memory 9 through write means 81. Subsequently, read means 82 reads out an image of the frame memory 9, and sends it to calculation means 83 for focus adjustment evaluation quantity, and the focus adjustment evaluation quantity is calculated by processing an image which is read out by the focus adjustment evaluation quantity calculating means 83. The calculated focus adjustment evaluation quantity is evaluated by the focus adjustment evaluation means 84, and a movement amount of the motor is calculated by a motor movement amount calculating means 85, and the motor 6 is driven by one step via a driver circuit 11 in a direction in which the focus adjustment evaluation quantity approaches the maximum. Beside, operation of the respective means of the control part 8 is made so as to be carried out during a blanking time between an electric charge storage time of a first image and an electric charge storage time of the next image by the CCD camera on the basis of a signal from a blanking time synchronous means 86 synchronizing with a clock signal from a clock signal generation circuit 12.

Subsequently, fundamental operation of the control part 8 is elucidated dividing it to the case of 2:1 the interlace mode and the noninterlace mode.

FIG. 6 shows the operation in the 2:1 interlace mode, data of odd field only is utilized for image processing, and data of even field is not utilized.

A video transfer $B_1$ of the first image B to the frame memory and calculation (image processing) $B_2$ of the focus adjustment evaluation quantity on the basis thereof are completed during the electric charge storage time of a second image C, and position control $B_3$ of the optical system based on the first image B is carried out during a blanking time between the electric charge storage times of the second image C and a third image D. Thereafter, in the same manner, when a transfer time of one field is T, the above-mentioned process is repeated with the periodic time of 2T.

Even though the position control $B_3$ of the optical system based on the first image B is not completed within the blanking time and overlaps onto the electric charge storage time of the third image D, it is admissible if the overlap is slight and does not give any influence on an accuracy in calculation of the focus adjustment evaluation, namely, it is in such a range that a position $GZ_1$ of $H_{max}$ in FIG. 2 does not vary. In the same manner, position control $B_3$ of the optical system is may be started from just prior to the finish of the electric charge storage time of the second image C as far as in a range which does not give influence.

As mentioned above, according to the present embodiment, by carrying out position control of the optical system during a storage blank time of the camera, focusing in the 2:1 interlace mode is completed in the same periodic time (2T) which is identical with the process of the conventional noninterlace, and a time decrease by about 0.2 seconds is realized since the switching from the noninterlace to 2:1 interlace is not required, and the brightness of the image is constant.

Next, the fundamental operation of the control part 8 in the noninterlace case is shown in FIG. 7. A video transfer $A_1$ of the first image A to a frame memory is carried out during the electric charge storage time of the second image B, image processing $A_2$ based on the first image A is carried out during the electric charge storage time of the third image C, and the video transfer $B_1$ of the second image B, and the position control $A_3$ of the optical system based on the result is carried out during a blanking time between the electric charge storage times of the third image C and a fourth image D. Thereafter, in the same manner, when the transfer time of one field is T, the process of the above-mentioned one are parallelly repeated with the periodic time T.

As mentioned above, according to the present embodiment, by carrying out the position control of the optical system during the storage blank time of the camera, focusing can be performed with the speed as twice fast as that of the conventional speed in the noninterlace mode. Depending on the characteristic of the object to be inspected, in case the same measuring accuracy as in the 2:1 interlace is obtainable keeping the noninterlace, or in case a sufficient accuracy was obtained keeping the noninterlace, by keeping out the focusing and the measurement after focus completion in the noninterlace mode a fastest focusing can be performed.

INDUSTRIAL APPLICABILITY

As mentioned above, according to the present invention, since movement of the optical system is performed during a blanking time between electric charge storage times of consecutive two images or during very short time periods before and after thereof, the process for focusing is achieved with a twice periodic time in comparison with that which moves during a storage time of the subsequent image as the conventional one. Still more, it is possible to offer an automatic focus adjustment apparatus which brings a superior effect that the speed fairly increases in the 2:1 interlace than the conventional noninterlace one and the brightness of the image does not vary between focusing time and in measurement time after the focus completion.

I claim:

1. An automatic focusing adjustment apparatus comprising:
   a camera using a solid-state image pickup device for picking up an object to be inspected and opto-electrically converting an image of said object to a video signal,
   means for transferring said video signal from said camera to a memory through an A/D converter,
   means for reading out the image information stored in said memory and outputting a read signal,
   means for calculating a focus adjustment evaluation quantity by carrying out image processing of said read signal,
   focus adjustment evaluation means for judging completion of focus when the focus adjustment evaluation quantity becomes a maximum and outputting a judging signal representative thereof,
   means for calculating a movement quantity of a motor for driving the optical system on the basis of said judging signal from said focus adjustment evaluation means and outputting a motor movement signal representative thereof,
   a drive circuit for driving said motor in a stepwise manner on the basis of said motor movement signal from the motor movement quantity calculation means, and
   blanking time synchronization means, responsive to a clock signal from a clock generation circuit, for synchronizing said drive circuit to perform position control operation of said optical system during a blanking time between electric charge storage time of two consecutive images of said camera or during a part of a time of said electric charge storage times before or after said blanking time in a range which does not give influence to an accuracy of calculation of said focus adjustment evaluation quantity.

2. An automatic focus adjustment apparatus comprising:
   means for picking up an image of an object to be inspected through an optical system;
   a camera having a 2:1 interlacing mode for opto-electronically converting said image into alternating odd number fields and even number fields and outputting a video signal representative of a first image of one of said odd or even number fields;
   means for digitizing said signal;
   means for transferring said digitized video signal to a memory;
   means for carrying out image processing of said transferred digitized video signal read out from said memory to obtain a focus adjustment evaluation quantity, said transfer and image processing of said first image as represented by said video signal being completed during an electric charge storage time of a second image of said one of said odd or even number fields, said means for carrying out image processing using only digitized video signals representing said one of said odd or even number fields; and
   means for performing position control of said optical system in a direction that said focus adjustment evaluation quantity approaches a maximum, said position control means performing said position control of said optical system based on said first image during a blanking time between electric charge storage times of said second image and a third image of said one of said odd or even number fields or during a start part of time of the electric charge storage time of said third image or an end part of time of the electric charge storage time of said second image within a range that does not influence accuracy of the focus adjustment evaluation quantity.

3. An automatic focus adjustment apparatus comprising:
   means for picking up an image of an object to be inspected through an optical system;
   a camera having a noninterlace mode for opto-electrically converting said image to a video signal representing a first image;
   means for digitizing said signal;
   means for transferring said digitized video signal to a memory, said transfer of said digitized video signal representing said first image being performed during an electric charge storage time of a second consecutive image in said camera;
   means for carrying out image processing of said transferred digitized video signal read out from said frame to obtain a focus adjustment evaluation quantity, said means for carrying out performing said image processing of said first image as represented by said video signal during said electric charge storage time of a third image consecutive to said second image; and
   means for performing position control of said optical system in a direction that said focus adjustment evaluation quantity approaches a maximum, said position control means performing said position control of said optical system based on said first image during a blanking time between electric charge storage times of said third image and a fourth image consecutive to said third image or during a start part of time of the electric charge storage time of said fourth image or an end part of time of the electric charge storage time of said third image.

4. A method for automatically focusing an optical system comprising the steps of:
   picking up an image of an object to be inspected through said optical system;
   converting said image into a video signal using a camera having a 2:1 interlacing mode, said camera opto-electronically converting said image into alternating odd number fields and even number fields, said video signal being representative of a first image of one said odd or even number fields;

digitizing said video signal;

transferring said digitized video signal to a memory;

carrying out image processing of said transferred digitized video signal read out from said memory to obtain a focus adjustment evaluation quantity, said transfer and image processing of said first image as represented by said video signal being completed during an electric charge storage time of a second image of said one of said odd or even number fields, said step of carrying out image processing being executed using only digitized video signals representing said one of said odd or even number fields; and performing position control of said optical system in a direction that said focus adjustment evaluation quantity approaches a maximum, said position control step being executed based on said first image during a blanking time between electric charge storage times of said second image and a third image of said one of said odd or even number fields or during a start part of time of the electric charge storage time of said third image or an end part of time of the electric charge storage time of said second image within a range that does not influence accuracy of the focus adjustment evaluation quantity.

5. A method for automatically focussing an optical system comprising the steps of:

picking up an image of an object to be inspected through an optical system;

opto-electrically converting said image into a video signal using a camera having a noninterlace mode, said video signal representing a first image;

digitizing said video signal;

transferring said digitized video signal to a memory, said transfer of said digitized video signal representing said first image being performed during an electric charge storage time of a second consecutive image in said camera;

carrying out image processing of said transferred digitized video signal read out from said frame to obtain a focus adjustment evaluation quantity, said image processing of said first image as represented by said video signal being carried out during said electric charge storage time of a third image consecutive to said second image; and performing position control of said optical system in a direction that said focus adjustment evaluation quantity approaches a maximum, said position control step being executed based on said first image during a blanking time between electric charge storage times of said third image and a fourth image consecutive to said third image or during a start part of time of the electric charge storage time of said fourth image or an end part of time of the electric charge storage time of said third image.

* * * * *